(No Model.)

E. HILL.
VALVE FOR AIR COMPRESSORS.

No. 244,127. Patented July 12, 1881.

WITNESSES
Eugene N. Eliot
Frank E. Randall

INVENTOR
Ebenezer Hill

UNITED STATES PATENT OFFICE.

EBENEZER HILL, OF SOUTH NORWALK, CONNECTICUT.

VALVE FOR AIR-COMPRESSORS.

SPECIFICATION forming part of Letters Patent No. 244,127, dated July 12, 1881.

Application filed December 9, 1880. (No model.)

*To all whom it may concern:*

Be it known that I, EBENEZER HILL, of South Norwalk, in the county of Fairfield and State of Connecticut, have invented new and useful Improvements in Valves for Air-Compressors, of which the following is a specification.

This invention relates to certain improvements in valves for air-compressors in which disk or puppet valves are used for inlet-valves to the cylinder; and the invention consists in combining, with the cylinder of an air-compressing engine having a recess in the inner face of its head to receive the valve, a valve having a lower stem, and a shield or guard-plate having a central opening to receive the stem of the valve, placed over the opening in the cylinder-head, to prevent the accidental displacement of the valve should breakage thereof occur, as will hereinafter more fully appear.

Figure 1:
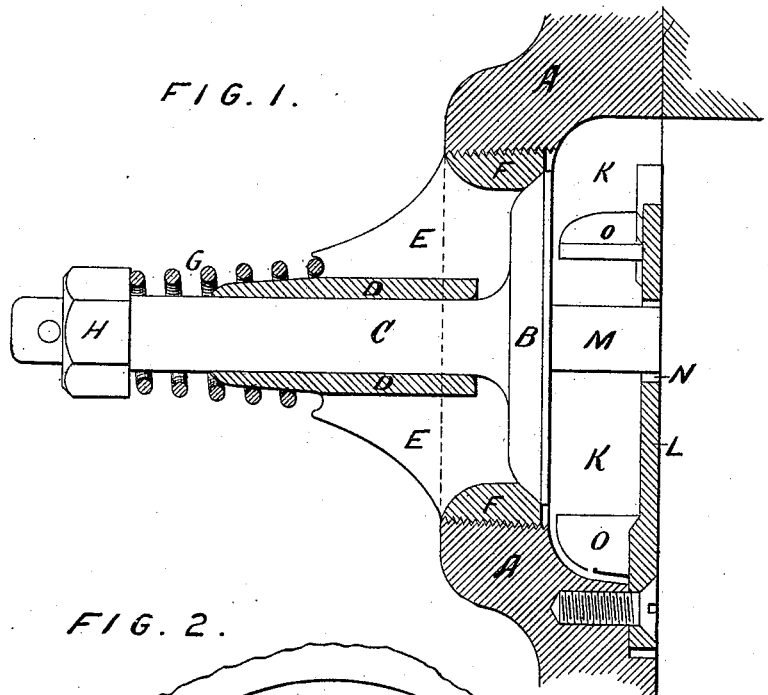
Figure 2:
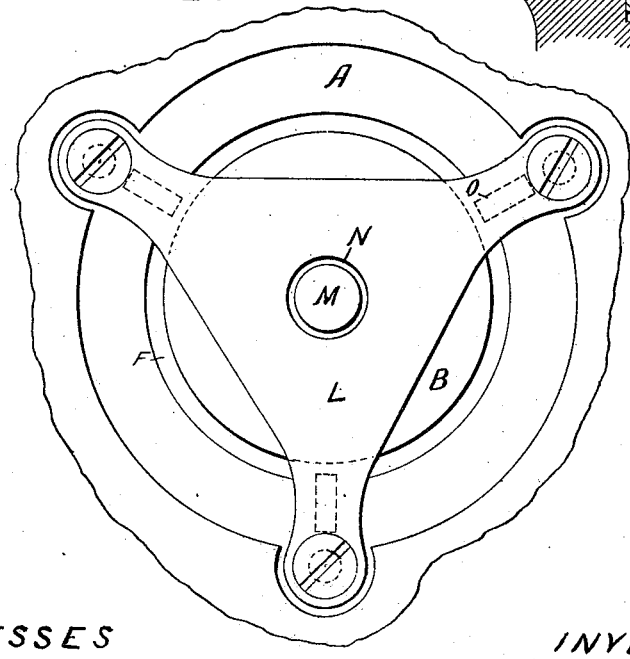

In the drawings, Figure 1 is a section of a portion of a cylinder-head, with the valve-seat and guide also in section. Fig. 2 is a plan of the inner face of the guard or shield.

At A is represented a portion of the cylinder-head of an air-compressor, and at B is the valve, of the ordinary disk form, which is supported by its stem at C in a tube, as at D, which is supported by wings, as at E, cast upon the seat, as at F, which is driven or screwed into the head of the cylinder. A spring, as at G, to close the valve, and a check-nut, as at H, are also shown in Fig. 1.

At K, in the head of the cylinder, is a recess or chamber of sufficient size and depth to permit the entire disk of the valve to enter when fully open, and yet be within the inner face of the head; and over said chamber is fastened a shield or guard, as at L, which may be let into the face of the cylinder, so that its inner face and the face of the shield may be flush with each other, as shown in Fig. 1, and so that the piston may work up close to the head, if desired.

Upon the inner face of the valve a stem, as at M, is formed to extend into a hole in the shield, as at N, to serve as a support to the valve in case it is broken from its stem from any cause whatever, and thus the valve might work for a time by its bearing in the shield or guard.

As an additional means of safety, guides may be formed on the guard, as at O, to extend, say, from three points into the recess in the head, and so that their edges would receive the disk of the valve, and thereby serve to guide it to and from its seat in case it were broken from its stem.

It is evident that the form of these guards may be different from that shown in the drawings, and instead of a single piece of metal for each valve a plate may be used for all the valves in the head. So, also, with reference to the stem that works in the guard or shield. It may be made very large, and thereby diminish the dead-air space formed by such recesses in the head.

I therefore claim—

1. In an air-compressing engine, in combination with the cylinder, a shield secured on inside of cylinder-head and having a central opening, combined with a disk-valve having a stem which enters the opening in the shield, substantially as and for the purposes hereinbefore set forth.

2. In an air-compressing engine, in combination with a disk-valve with stem C and spindle M, the shield L, having central opening, N, and guards O, as hereinbefore set forth.

3. The spring-valve B, with stem C, spring G, nut H, support D E, and stem M, secured in the cylinder-head of an air-compressing engine, combined with a shield, L, having central opening, N, and guards O, substantially as and for the purposes hereinbefore set forth.

In testimony whereof I have hereunto set my hand and seal in the presence of two subscribing witnesses.

EBENEZER HILL. [L. S.]

Witnesses:
EUGENE N. ELIOT,
FRANK E. RANDALL.